(12) United States Patent
Takemoto et al.

(10) Patent No.: US 8,808,937 B2
(45) Date of Patent: Aug. 19, 2014

(54) VEHICLE FUEL CELL COOLING SYSTEM

(75) Inventors: Shinichiro Takemoto, Yokohama (JP);
Keisuke Wakabayashi, Yokohama (JP);
Takahito Osada, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 580 days.

(21) Appl. No.: 13/061,287

(22) PCT Filed: Jun. 4, 2009

(86) PCT No.: PCT/JP2009/060236
§ 371 (c)(1),
(2), (4) Date: Feb. 28, 2011

(87) PCT Pub. No.: WO2010/029797
PCT Pub. Date: Mar. 18, 2010

(65) Prior Publication Data
US 2011/0159393 A1      Jun. 30, 2011

(30) Foreign Application Priority Data

Sep. 9, 2008   (JP) ................. 2008-230917

(51) Int. Cl.
*H01M 8/04* (2006.01)
*B60L 11/18* (2006.01)

(52) U.S. Cl.
CPC ............ *H01M 8/04037* (2013.01); *Y02T 90/32* (2013.01); *B60L 11/1883* (2013.01); *H01M 2250/20* (2013.01); *H01M 8/04529* (2013.01); *H01M 8/04029* (2013.01); *H01M 8/04723* (2013.01); *H01M 8/04253* (2013.01); *Y02T 90/34* (2013.01); *H01M 8/04768* (2013.01); *H01M 8/04955* (2013.01); *Y02E 60/50* (2013.01); *H01M 8/04731* (2013.01); *H01M 8/0438* (2013.01); *H01M 8/04268* (2013.01); *B60L 11/1892* (2013.01); *H01M 8/04358* (2013.01)
USPC ........... 429/436; 429/437; 429/442; 429/429; 429/413; 429/414

(58) Field of Classification Search
CPC ................. H01M 2250/20; H01M 8/04358; H01M 8/04828; H01M 8/0438
USPC .................................................. 429/400–535
See application file for complete search history.

(56) References Cited

U.S. PATENT DOCUMENTS

2004/0028970 A1    2/2004   Sakai et al.
(Continued)

FOREIGN PATENT DOCUMENTS

| CN | 1474472 A | 2/2004 |
|---|---|---|
| CN | 1572037 A | 1/2005 |
| CN | 101197451 A | 6/2008 |
| JP | 2002-343396 A | 11/2002 |

(Continued)

*Primary Examiner* — Patrick Ryan
*Assistant Examiner* — Alex Usyatinsky
(74) *Attorney, Agent, or Firm* — Foley & Lardner LLP

(57) ABSTRACT

A system includes a radiator side flow path for supplying a coolant which has cooled a fuel cell stack to a radiator, a bypass flow path for allowing the coolant which has cooled the fuel cell stack to bypass the radiator, a thermostat valve for increasing a flow rate of the coolant flowing through the radiator side flow path in a case where the temperature of the coolant is high as compared to a case where the temperature of the coolant is low, and an electric heater for warming up the coolant. The electric heater is controlled based on an outside atmospheric pressure and on the temperature of the coolant such that the temperature of the coolant flowing into the fuel cell stack is raised in a case where the outside atmospheric pressure is high as compared to a case where the outside atmospheric pressure is low.

11 Claims, 9 Drawing Sheets

(56) References Cited

U.S. PATENT DOCUMENTS

| | | | |
|---|---|---|---|
| 2006/0121326 A1* | 6/2006 | Hiramatsu et al. | 429/25 |
| 2006/0147772 A1* | 7/2006 | Takemoto | 429/24 |
| 2007/0184318 A1* | 8/2007 | Katano | 429/25 |
| 2008/0138671 A1 | 6/2008 | Kolodziej et al. | |

FOREIGN PATENT DOCUMENTS

| | | |
|---|---|---|
| JP | 2004-158279 A | 6/2004 |
| JP | 2005-044749 A | 2/2005 |
| JP | 2005-183281 A | 7/2005 |
| JP | 2005-251693 A | 9/2005 |

* cited by examiner

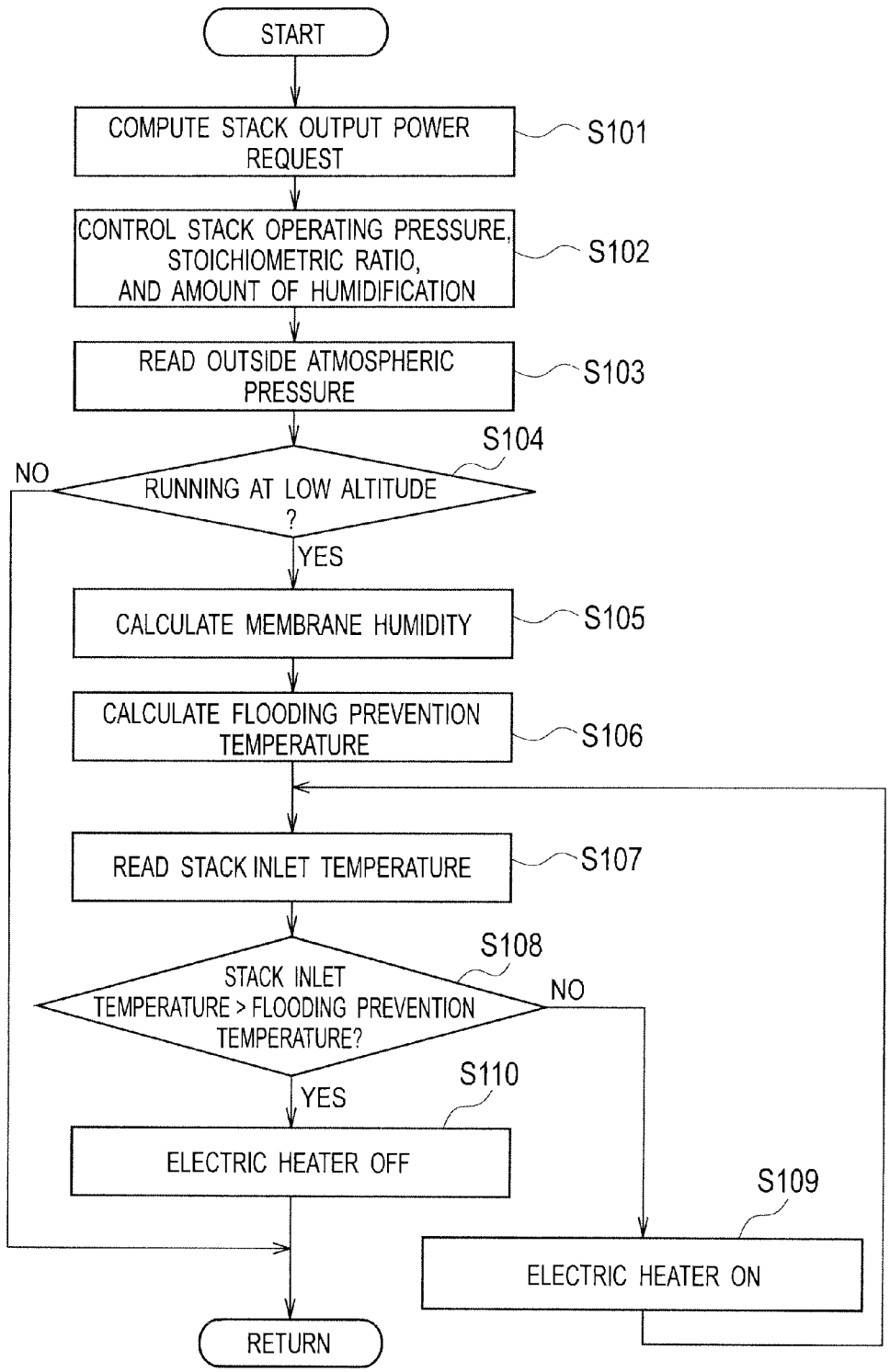

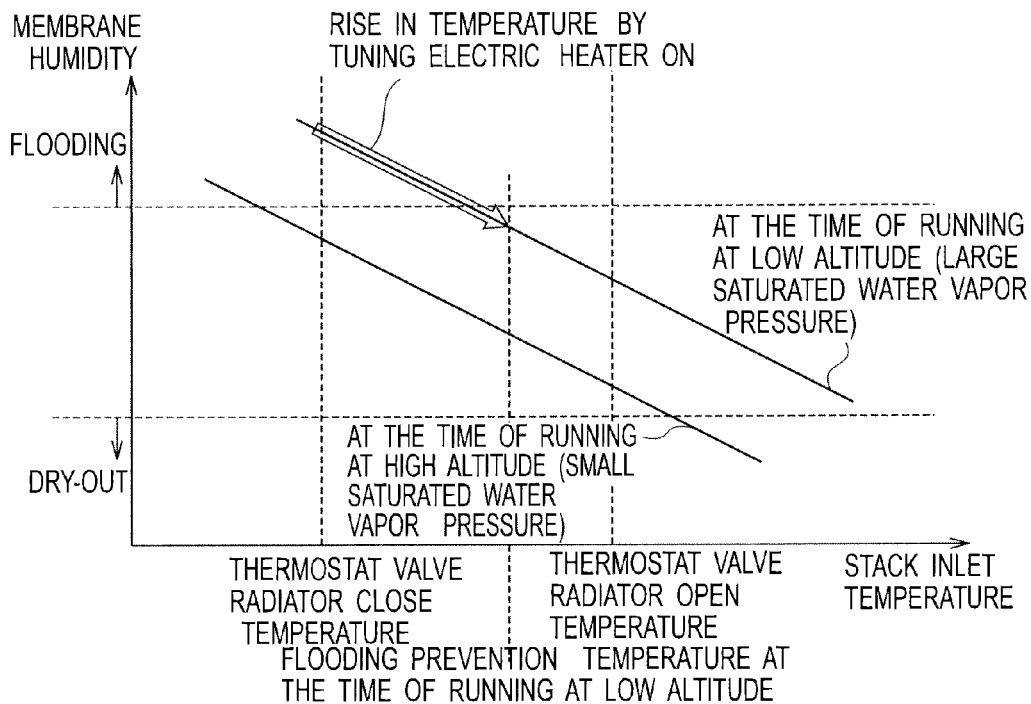

|  | STACK INLET TEMPERATURE | | | | | |
|---|---|---|---|---|---|---|
|  |  | START AT TEMPERATURE BELOW 0°C | EQUAL TO OR BELOW 50°C | AROUND 50°C | 50°C TO 60°C | AROUND 60°C | EQUAL TO OR ABOVE 60°C |
| LOW ALTITUDE | STACK FLOW RATE | 15L/min | 15L/min | 15L/min | 15L/min | 15L/min | 15~100L/min |
| | THERMOSTAT VALVE | BYPASS SIDE | BYPASS SIDE | BYPASS SIDE | BYPASS SIDE | INTERMEDIATE OPENING DEGREE | RADIATOR SIDE |
| | ELECTRIC HEATER | ON | OFF | OFF~ON | ON | ON~OFF | OFF |
| HIGH ALTITUDE | STACK FLOW RATE | 15L/min | 15L/min | 15L/min | 15L/min | 15L/min | 15~100L/min |
| | THERMOSTAT VALVE | BYPASS SIDE | BYPASS SIDE | INTERMEDIATE OPENING DEGREE | RADIATOR SIDE | RADIATOR SIDE | RADIATOR SIDE |
| | ELECTRIC HEATER | ON | OFF | OFF | OFF | OFF | OFF |

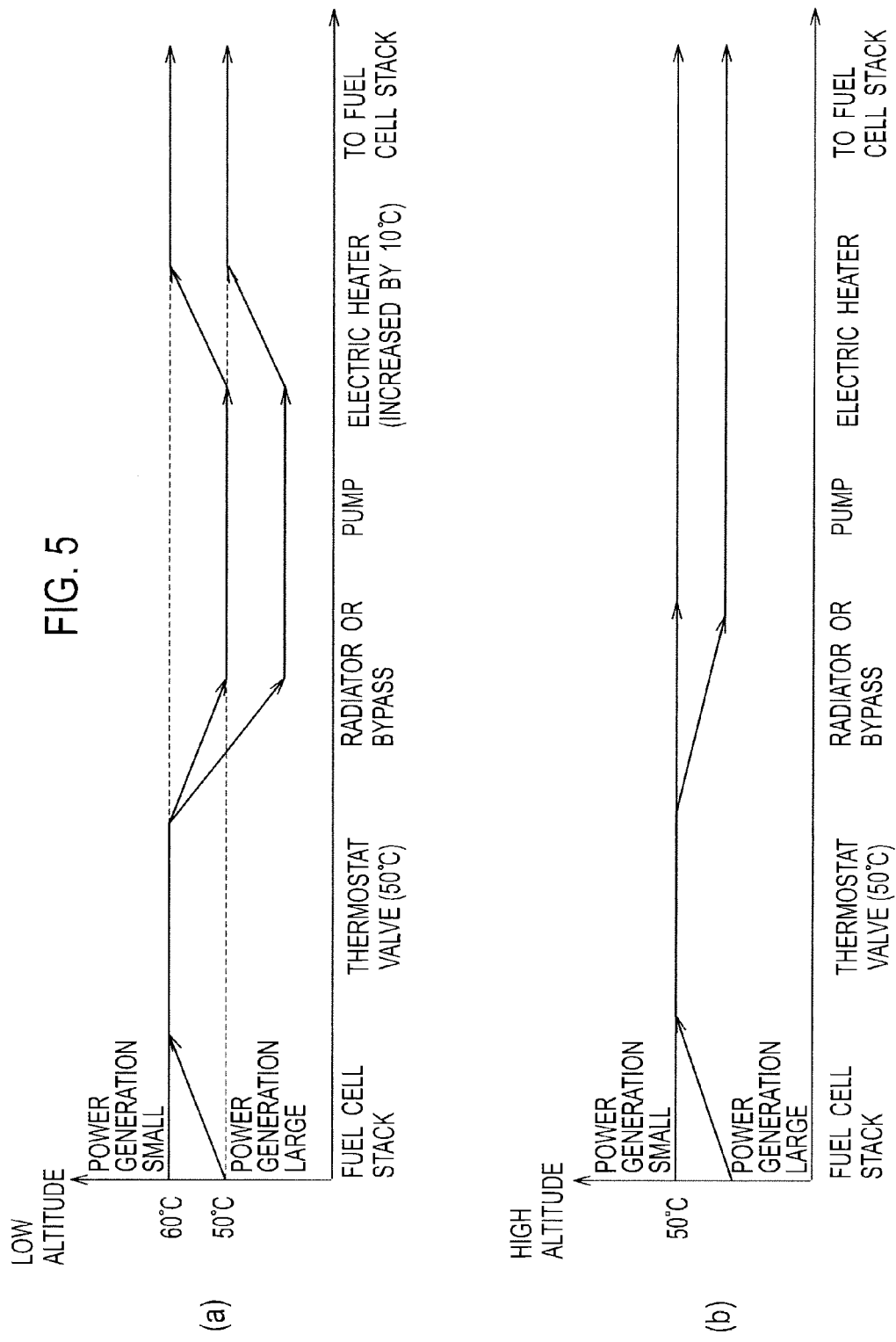

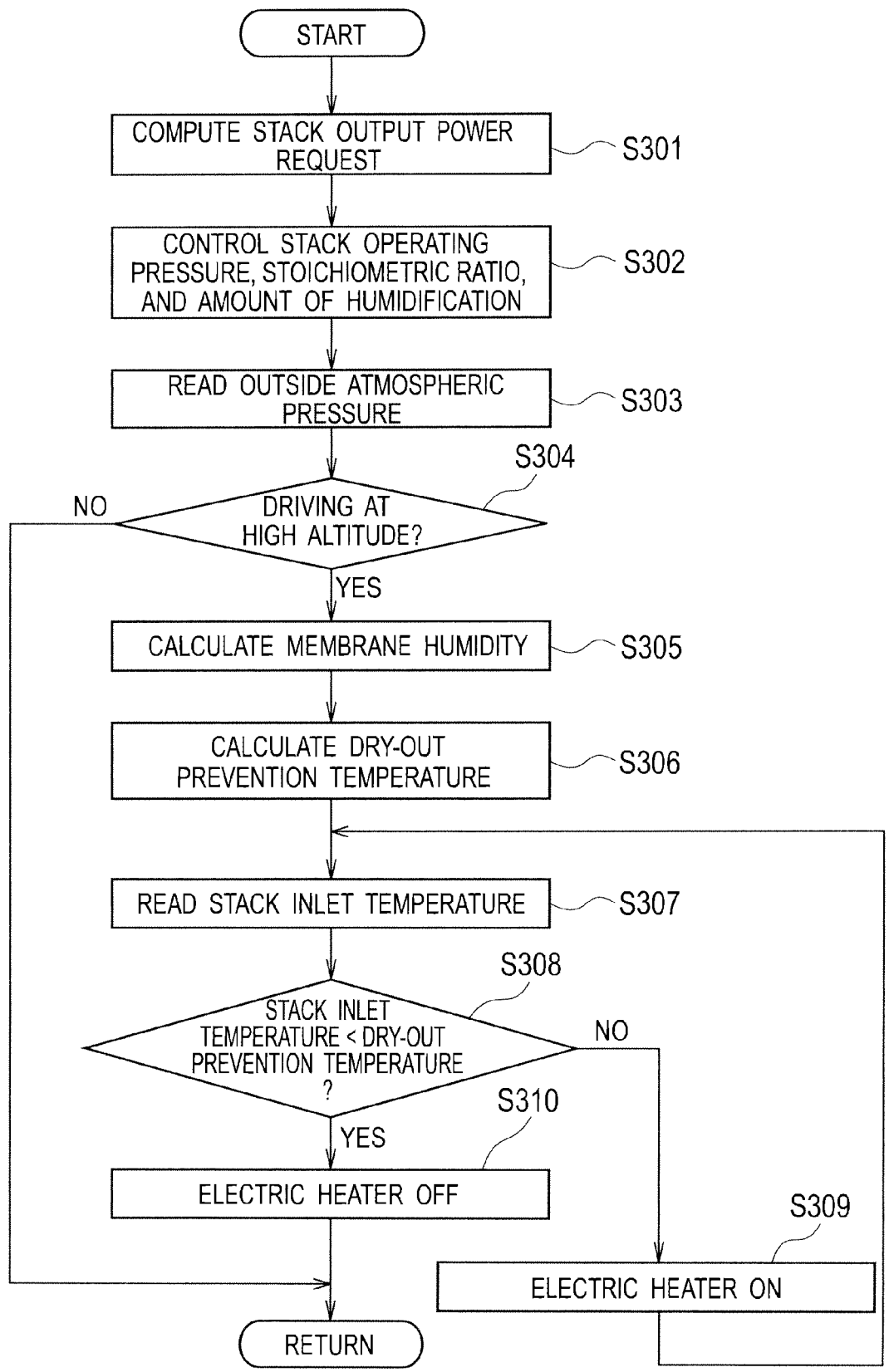

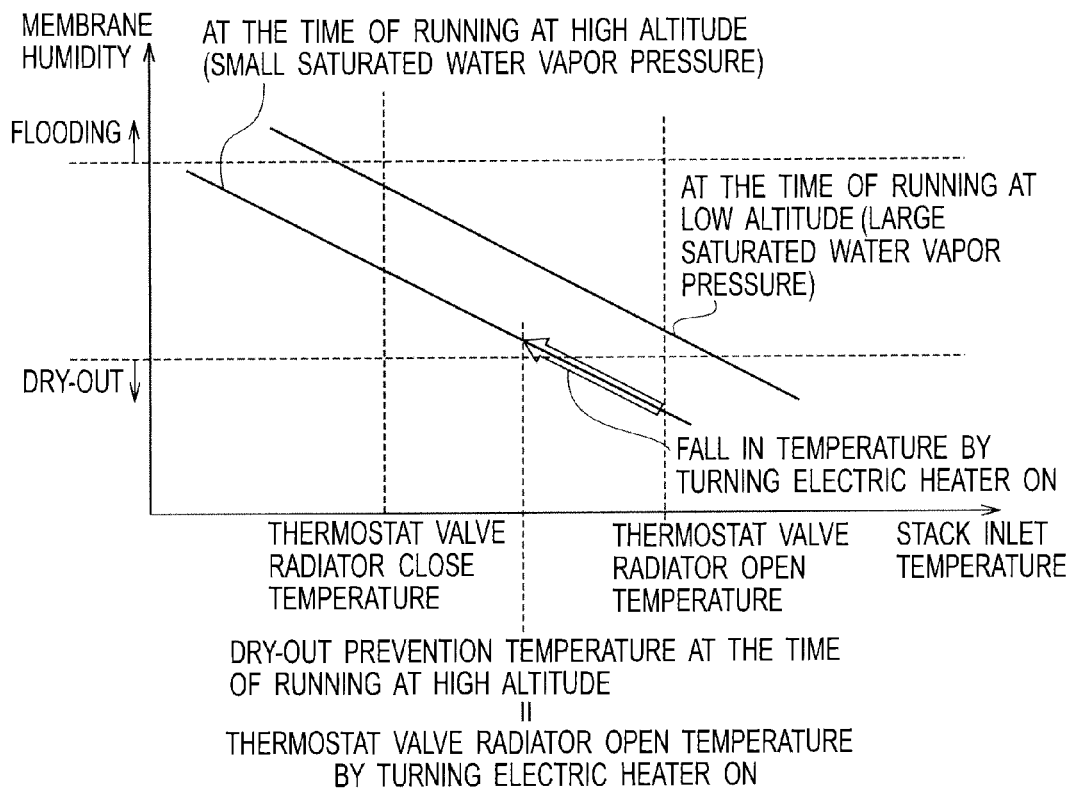

|  | STACK INLET TEMPERATURE | | | | | |
|---|---|---|---|---|---|---|
|  | START AT TEMPERA-TURE BELOW 0°C | EQUAL TO OR BELOW 50 °C | AROUND 50°C | 50°C TO 60°C | AROUND 60°C | EQUAL TO OR ABOVE 60°C |
| LOW ALTITUDE — STACK FLOW RATE | 15L/min | 15L/min | 15L/min | 15L/min | 15L/min | 15~100L/min |
| LOW ALTITUDE — THERMOSTAT VALVE | BYPASS SIDE | BYPASS SIDE | BYPASS SIDE | BYPASS SIDE | INTERME-DIATE OPENING DEGREE | RADIATOR SIDE |
| LOW ALTITUDE — ELECTRIC HEATER | ON | OFF | OFF | OFF | OFF | OFF |
| HIGH ALTITUDE — STACK FLOW RATE | 15L/min | 15L/min | 15L/min | 15L/min | 15L/min | 15~100L/min |
| HIGH ALTITUDE — THERMOSTAT VALVE | BYPASS SIDE | BYPASS SIDE | INTERME-DIATE OPENING DEGREE | RADIATOR SIDE | RADIATOR SIDE | RADIATOR SIDE |
| HIGH ALTITUDE — ELECTRIC HEATER | ON | OFF | OFF~ON | ON | ON~OFF | OFF |

VEHICLE FUEL CELL COOLING SYSTEM

TECHNICAL FIELD

The present invention relates to a vehicle fuel cell cooling system configured to circulate and supply a coolant to a fuel cell installed in a vehicle and to perform temperature adjustment of the fuel cell.

BACKGROUND ART

As a vehicle fuel cell cooling system for performing temperature adjustment of a fuel cell by circulating and supplying a coolant to a fuel cell installed in a vehicle, a system disclosed in Patent Document 1 has heretofore been known, for example. This vehicle fuel cell cooling system includes a radiator configured to cool down a coolant by heat radiation, a coolant circulation circuit configured to circulate the coolant between a fuel cell and the radiator, a bypass passage configured to feed the coolant while bypassing the radiator, and a thermostat valve configured to switch whether the coolant is fed to the radiator or to the bypass passage depending on a temperature of the coolant. Here, the system is configured to control the temperature of the coolant to be supplied to the fuel cell by switching a flow path of the coolant with the thermostat valve, thereby maintaining the fuel cell at a proper temperature.

CITATION LIST

Patent Literature

[PTL1]
PLT 1: Japanese Patent Application Publication No. 2004-150279

SUMMARY OF INVENTION

Technical Problem

However, because a saturated water vapor pressure fluctuates due to a change in the atmospheric pressure between a case where a vehicle runs at high altitude and a case where the vehicle runs at low altitude, a membrane of the fuel cell tends to get dried easily at high altitude, and, on the other hand, the membrane of the fuel cell tends to become overhydrated at low altitude. Therefore, there is a case where it is difficult to maintain a moisture condition of the membrane of the fuel cell within a proper range just by adjusting the temperature of the coolant to be supplied to the fuel cell by the operation of the thermostat valve.

Solution to Problem

A vehicle fuel cell cooling system according to the present invention includes: a first coolant flow path configured to supply a coolant which has cooled a fuel cell to a radiator; a second coolant flow path configured to allow the coolant which has cooled the fuel cell to bypass the radiator; a thermostat valve configured to switch between the first coolant flow path and the second coolant flow path in accordance with a temperature of the coolant and to increase a flow rate of the coolant flowing through the first coolant flow path in a case where the temperature of the coolant is high as compared to a case where the temperature of the coolant is low; and a warming device configured to warm up the coolant. The vehicle fuel cell cooling system according to the present invention controls the warming device based on the temperature of the coolant and on an outside atmospheric pressure and raises the temperature of the coolant flowing into the fuel cell, in a case where the outside atmospheric pressure is high as compared to a case where the outside atmospheric pressure is low, thereby, solving the aforementioned problem.

Advantageous Effects of Invention

According to a vehicle fuel cell cooling system of the present invention, it is possible to prevent dry-out attributable to drying of a membrane at high altitude having a low atmospheric pressure, by controlling a temperature of a coolant to be supplied to a fuel cell at a lower level and to prevent flooding attributable to overhydration at low altitude having a high atmospheric pressure, by controlling the temperature of the coolant to be supplied to the fuel cell at a higher level. Hence, it is possible to maintain a moisture condition of the membrane of the fuel cell always within a proper range irrespective of running environment of the vehicle.

BRIEF DESCRIPTION OF DRAWINGS

FIG. 2 is a flowchart showing a flow of control by an ECU of the vehicle fuel cell cooling system of the first embodiment.

FIG. 3 is a view for explaining an outline of temperature control of a coolant in the vehicle fuel cell cooling system of the first embodiment, which is a characteristic chart showing relations between stack inlet temperature and membrane humidity of a solid polymer electrolyte membrane at the time of running at low altitude and at the time of running at high altitude.

FIG. 4 is a view showing an example of an operating state of a thermostat valve relative to the stack inlet temperature and activation timing of an electric heater.

FIG. 5 is a view showing how the temperature of the coolant changes in each unit provided on a coolant circulation flow path.

FIG. 9 is a flowchart showing a flow of control by an ECU of the vehicle fuel cell cooling system of the third embodiment.

FIG. 10 is a view for explaining an outline of temperature control of a coolant in the vehicle fuel cell cooling system of the third embodiment, which is a characteristic chart showing relations between stack inlet temperature and membrane humidity of a solid polymer electrolyte membrane at the time of running at low altitude and at the time of running at high altitude.

FIG. 11 is a view showing an example of an operating state of a thermostat valve relative to the stack inlet temperature and activation timing of an electric heater.

DESCRIPTION OF EMBODIMENTS

Concrete embodiments of the present invention will be described below in detail with reference to the drawings.

<First Embodiment>

Figure 1:
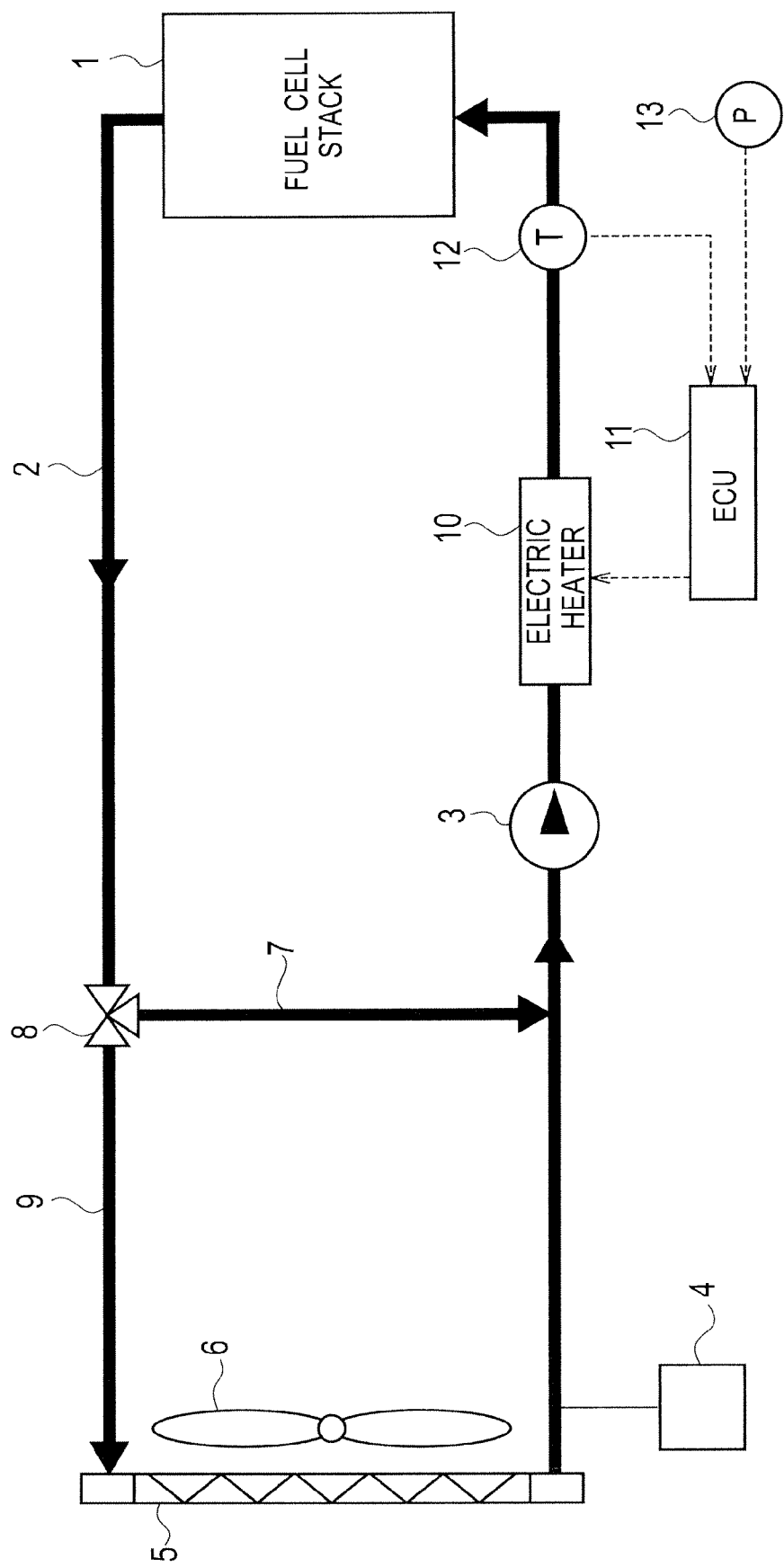
FIG. 1 is a configuration diagram showing a configuration of a vehicle fuel cell cooling system of a first embodiment.

FIG. 1 shows a configuration example of a vehicle fuel cell cooling system to which the present invention is applied. This vehicle fuel cell cooling system is configured to perform temperature adjustment of a fuel cell stack 1 mounted as a power source of a fuel cell vehicle, by circulating and supplying a coolant to the fuel cell stack 1.

The fuel cell stack 1 is formed by stacking multiple power generating cells on multiple layers. Each of the power generating cells constituting the fuel cell stack 1 is configured to sandwich a membrane electrode assembly, which is formed by disposing between separators a fuel electrode for receiving supply of a fuel gas and an oxidant electrode for receiving supply of an oxidant gas so as to face each other while interposing a solid polymer electrolyte membrane therebetween. The separators of this power generating cell are provided with a fuel gas flow path for feeding the fuel gas to the fuel electrode side and an oxidant gas flow path for feeding the oxidant gas to the oxidant electrode side. Moreover, in the fuel cell stack 1, the fuel gas containing hydrogen is supplied to the fuel electrode side of each of the power generating cells and the oxidant gas (air) containing oxygen is supplied to the oxidant electrode side thereof, and respective ions move and contact one another through the solid polymer electrolyte membrane while using moisture as a medium, thereby generating electric power.

In the above-described fuel cell stack 1, it is important to keep the temperature thereof at a proper temperature in order to continue power generation in an optimum state while maintaining a moisture condition of the solid polymer electrolyte membrane of each power generating cell within a proper range. Accordingly, the temperature adjustment of the fuel cell stack 1 is performed by providing the cooling system as shown in FIG. 1 and circulating and supplying the coolant to the fuel cell stack 1. It is to be noted that a fuel gas supply system for supplying the fuel gas to the fuel cell stack 1, an oxidant gas supply system for supplying the oxidant gas thereto, a humidification system for humidifying the fuel cell stack 1, and the like are connected to the fuel cell stack 1. Here, publicly known configurations may be employed for the fuel gas supply system, the oxidant gas supply system, the humidification system, and the like. Thus, illustration of these systems is omitted in FIG. 1.

In this vehicle fuel cell cooling system shown in FIG. 1, a coolant circulation flow path 2 constituting a flow path for the coolant to be circulated and supplied to this fuel cell stack 1 is connected to the fuel cell stack 1. Moreover, this coolant circulation flow path 2 is provided with a pump 3 for providing kinetic energy to the coolant, a reservoir tank 4 for collecting and storing excessive coolant, a radiator 5 for cooling the coolant by radiating the heat of the coolant that is warmed up by the fuel cell stack 1 to outside air, and the like. A radiator fan 6 is disposed in the vicinity of the radiator 5.

Meanwhile, the coolant circulation flow path 2 is provided with a bypass flow path 7 that bypasses the radiator 5, and a thermostat valve 8 is provided at a branching point of this bypass flow path 7. The thermostat valve 8 operates in accordance with the temperature of the coolant flowing into the thermostat valve 8 and switches the flow path of the coolant discharged from the fuel cell stack 1 between a flow path to pass through the radiator (this flow path will be hereinafter referred to as a radiator side flow path 9) and the bypass flow path 7 to bypass the radiator 5. Here, when the temperature of the coolant flowing into this thermostat valve 8 is close to an operating temperature of the thermostat valve 8, a degree of opening of the thermostat valve 8 is set to an intermediate degree of opening whereby the coolant discharged from the fuel cell stack 1 is distributed to both of the radiator side flow path 9 and the bypass flow path 7 at a predetermined proportion.

Moreover, particularly in the vehicle fuel cell cooling system of this embodiment, an electric heater 10 is provided between an outlet of the thermostat valve 8 and a coolant inlet of the fuel cell stack 1 in the coolant circulation flow path 2, or namely, at a position immediately upstream of the coolant inlet of the fuel cell stack 1. This electric heater 10 is activated under control of an ECU (electronic control unit) 11 and is configured to heat the coolant to be supplied to the fuel cell stack 1 up to an optimum temperature when the temperature of the coolant to be supplied to the fuel cell stack 1 while a fuel cell vehicle is running at low altitude is not sufficiently high, as will be described later. Although it is possible to install a dedicated electric heater configured to be operated as described above as this electric heater 10, the vehicle fuel cell cooling system of this type is often equipped with an electric heater for heating the coolant in order to supply the high-temperature coolant to the fuel cell stack 1 at the time of start-up at a temperature below 0° C. or the like and thereby to promote warm-up. Such an electric heater may also be used instead. In this way, it is unnecessary to add a new device, thereby preventing a cost increase.

Meanwhile, in the vehicle fuel cell cooling system of this embodiment, a temperature sensor 12 is provided at the coolant inlet of the fuel cell stack 1, which is configured to detect a temperature (hereinafter referred to as a stack inlet temperature) of the coolant passing therethrough and flowing into the fuel cell stack 1. Moreover, an outside atmospheric pressure sensor 13 configured to detect an atmospheric pressure outside the fuel cell vehicle is also provided. A detection value of the temperature sensor 12 and a detection value of the outside atmospheric pressure sensor 13 are inputted to the ECU 11.

The ECU 11 is a control device mainly including a microcomputer and consolidating various digital circuits, analog circuits, electronic components, and the like and is configured to integrally control operations of an entire fuel cell system including the vehicle fuel cell cooling system of this embodiment. In particular, this ECU 11 has a function to control the activation of the electric heater 10 based on the stack inlet temperature detected with the temperature sensor 12 and on the outside atmospheric pressure in a running environment of the fuel cell vehicle detected with the outside atmospheric pressure sensor 13.

As described previously, in the vehicle fuel cell cooling system of this embodiment, the temperature of the coolant to be supplied to the fuel cell stack 1 is adjusted by operating the thermostat valve 8 in accordance with the temperature of the coolant flowing into the thermostat valve 8 and thereby switching the flow path of the coolant discharged from the fuel cell stack 1 between the radiator side flow path 9 and the bypass flow path 7. However, considering that there are a case where the fuel cell vehicle runs at high altitude having a low pressure and a case where the fuel cell vehicle runs at low altitude having a high pressure, it may be difficult to maintain the moisture condition of the solid polymer electrolyte membrane of the fuel cell stack 1 within the proper range just by controlling the temperature of the coolant by means of operating the thermostat valve 8. This is because a saturated water vapor pressure fluctuates due to a change in the atmospheric pressure. Specifically, an operating temperature of the thermostat valve 8 is a predetermined fixed value. Accordingly, if the operating temperature of the thermostat valve 8 is determined based on the case of running at high altitude, for example, the temperature of the coolant to be supplied to the fuel cell stack 1 may be too low at the time of operation at low altitude having a high pressure. Hence, generation of condensed water inside the fuel cell stack 1 may be promoted, and the moisture condition of the solid polymer electrolyte membrane of the fuel cell stack 1 may become excessively wet, thereby causing flooding (clogging of water). Here, it is also conceivable that the temperature of the coolant can be controlled so as to maintain the moisture condition of the solid polymer electrolyte membrane of the fuel cell stack 1 within the proper range at the time of running at high altitude as well as at the time of running at low altitude by use of an electrically controlled three-way valve that can perform fine opening control electrically instead of the thermostat valve 8. However, the use of the electrically controlled three-way valve instead of the thermostat valve 8 requires complicated structures and control for valve structures, actuators, control circuits, and so forth and thereby causing cost increases.

Accordingly, the vehicle fuel cell cooling system of this embodiment is premised on using the one as the thermostat valve 8, the operating temperature of which is determined to control the temperature of the coolant to be supplied to the fuel cell stack 1 at the temperature for maintaining the moisture condition of the solid polymer electrolyte membrane of the fuel cell stack 1 within the proper range at high altitude. If the temperature of the coolant to be supplied to the fuel cell stack 1 falls below a flooding prevention temperature (a first threshold) at the time of running at low altitude, which is determined in view of avoiding occurrence of flooding in the fuel cell stack 1 at low altitude, the ECU 11 heats the coolant by activating the electric heater 10 so as to prevent occurrence of such flooding in the fuel cell stack 1.

FIG. 2 is a flowchart showing a flow of control by the ECU 11 which is characteristic in this embodiment.

First, the ECU 11 computes an output power necessary for the fuel cell stack 1 based on a degree of opening of an accelerator of the fuel cell vehicle in step S101, and then causes the fuel cell stack 1 to perform power generation in step S102 in response to a stack output power request computed in step S101 while controlling an operating pressure, a stoichiometric ratio, and an amount of humidification of the fuel cell stack 1.

Meanwhile, in parallel with the processing in step S102, the ECU 11 reads the detection value of the outside atmospheric pressure sensor 13 in step S103, and then judges in step S104 whether or not the current running environment of the fuel cell vehicle is at high altitude or at low altitude based on the detection value of the outside atmospheric pressure sensor 13 read in step S103.

Then, if the ECU 11 judges that the fuel cell vehicle is running at low altitude, the ECU 11 calculates membrane humidity of the solid polymer electrolyte membrane of the fuel cell stack 1 by using the current operating pressure, stoichiometric ratio, amount of humidification, and saturated water vapor pressure of the fuel cell stack 1 in step S105, and calculates the flooding prevention temperature (the first threshold) which is the temperature of the coolant for avoiding occurrence of flooding in the fuel cell stack 1 in step S106. Here, this flooding prevention temperature is a value obtained by multiplying a flooding critical temperature by a safety ratio (from 1.05 to 1.10, for example) for absorbing a control delay between the activation of the electric heater 10 and rise in temperature of the fuel cell stack 1. Here, the flooding critical temperature constitutes a boundary of occurrence of flooding in the fuel cell stack 1 as the moisture condition of the solid polymer electrolyte membrane of the fuel cell stack 1 becomes excessively wet.

Next, in step S107, the ECU 11 reads the stack inlet temperature detected with the temperature sensor 12. Then, in step S108, the ECU 11 compares the stack inlet temperature read in step S107 with the flooding prevention temperature calculated in step S106. Thereafter, when the stack inlet temperature falls below the flooding prevention temperature, the electric heater 10 is activated in step S109 and the coolant to be supplied to the fuel cell stack 1 is warmed up by the heat from the electric heater 10. Then, the activation of the electric heater 10 is stopped in step S110 when the stack inlet temperature is increased to a temperature exceeding the flooding prevention temperature.

FIG. 3 is a view for explaining an outline of the temperature control of the coolant in the above-described vehicle fuel cell cooling system of this embodiment, which is a characteristic chart showing relations between the stack inlet temperature and the membrane humidity of the solid polymer electrolyte membrane at the time of running at low altitude and at the time of running at high altitude. Here, in this FIG. 3, the vertical axis indicates the membrane humidity of the solid polymer electrolyte membrane of the fuel cell stack 1 and the horizontal axis indicates the stack inlet temperature.

In the vehicle fuel cell cooling system of this embodiment, the one which is operated to maintain the moisture condition of the solid polymer electrolyte membrane of the fuel cell stack 1 within the proper range at high altitude where the saturated water vapor pressure is low, is used as the thermostat valve 8. Accordingly, while the fuel cell vehicle is running at high altitude, it is possible to prevent flooding and dry-out of the fuel cell stack 1 just by the temperature control of the coolant by operating this thermostat valve 8. On the other hand, since the saturated water vapor pressure at low altitude is higher than that at high altitude, the membrane humidity of the solid polymer electrolyte membrane of the fuel cell stack 1 tends to become high as compared to that at high altitude even when the stack inlet temperature is the same as shown in FIG. 3. Hence, there may be a case where flooding occurs in the fuel cell stack 1 if the temperature control of the coolant by means of operating the thermostat valve 8 is used alone. Therefore, in the case where the fuel cell vehicle is running at low altitude, the fuel cell stack 1 is prevented from flooding by activating the electric heater 10 when the stack inlet temperature falls below the flooding prevention temperature at the time of running at low altitude, and warming up the coolant by the heat from this electric heater 10. In this way, it is possible to maintain the moisture condition of the solid polymer electrolyte membrane of the fuel cell stack 1 within the proper range when the fuel cell vehicle is running at low altitude and when the fuel cell vehicle is running at high altitude, and thereby to prevent flooding and dry-out of the fuel cell stack 1.

Next, a concrete example of control to bring the stack inlet temperature close to an optimum value by use of the above-described vehicle fuel cell cooling system of this embodiment will be described with reference to FIG. 4 and FIG. 5. Here, FIG. 4 is a view showing an example of an operating state of the thermostat valve 8 and activation timing of the electric heater 10 relative to the stack inlet temperature, and FIG. 5 is a view showing how the temperature of the coolant changes in each unit provided on the coolant circulation flow path 2.

Experiments have shown that the fuel cell stack 1 applying the solid polymer electrolyte membrane to the electrolyte can generate electric power efficiently at low altitude (at an atmospheric pressure around 100 kPA) by controlling the stack inlet temperature around 60° C. Meanwhile, since the atmospheric pressure is reduced to about 70 to 80 kPA at high altitude, it is required to bring the stack inlet temperature close to about 50° C., for example. Accordingly, at low altitude, the coolant is warmed up by activating the electric heater 10 as shown in FIG. 4 and FIG. 5 while using the thermostat valve 8 that is operated so as to bring the stack inlet temperature close to 50° C., for example. In this way, the stack inlet temperature is controlled to be close to 60° C. Here, in the example shown in FIG. 4, the electric heater provided for promoting warm-up of the fuel cell stack 1 at the time of start-up at a temperature below 0° C. or the like is used as the electric heater 10 instead, and the electric heater 10 is therefore activated at low altitude and at high altitude when starting up at the temperature below 0° C. However, in the case other than the start-up at the temperature below 0° C., the electric heater 10 is activated at the time of running at low altitude in order to bring the stack inlet temperature close to 60° C. Here, assuming that a flow rate of the coolant to be supplied to the fuel cell stack 1 is equal to 15 L/min, a heater output around 10 kW is required to increase the temperature of the coolant by 10 degrees by means of activating the electric heater 10.

As shown in these FIG. 4 and FIG. 5, it turns out to be possible to bring the stack inlet temperature close to 50° C. at high altitude by operating the thermostat valve 8, and meanwhile, to bring the stack inlet temperature close to 60° C. at low altitude not only by operating the thermostat valve 8 but also by activating the electric heater 10.

As described above in detail by citing the concrete example, according to the vehicle fuel cell cooling system of this embodiment, in addition to the control of the temperature of the coolant to be supplied to the fuel cell stack 1 by operating the thermostat vale 8 so as to switch the flow path of the coolant, the coolant circulation flow path 2 is provided with the electric heater 10, and the ECU 11 is configured to control the activation of the electric heater 10 based on the outside atmospheric pressure in the running environment of the fuel cell vehicle to be detected with the outside atmospheric pressure sensor 13 and on the stack inlet temperature to be detected with the temperature sensor 12. Therefore, it is possible to maintain the moisture condition of the solid polymer electrolyte membrane of the fuel cell stack 1 within the proper range when the fuel cell vehicle runs at low altitude and when the fuel cell vehicle runs at high altitude, and thereby to prevent flooding and dry-out of the fuel cell stack 1.

In particular, the one which is configured to be operated so as to maintain the moisture condition of the solid polymer electrolyte membrane of the fuel cell stack 1 within the proper range at high altitude is used as the thermostat valve 8, and the ECU 11 controls to activate the electric heater 10 if the stack inlet temperature falls below the flooding prevention temperature at the time of running at low altitude when the fuel cell vehicle is running at low altitude. Accordingly, it is possible to reliably prevent flooding in the fuel cell stack 1 at the time of running at low altitude.

Meanwhile, the vehicle fuel cell cooling system of this embodiment is configured to switch the flow path of the coolant by using the simple thermostat valve 8 without using the electrically controlled three-way valve which involves the complicated structures and control. Accordingly, it is possible to realize the system at low costs. Moreover, by using the electric heater already installed for promoting warm-up when starting at the temperature below 0° C., as the electric heater 10, it is unnecessary to add a new device, thereby preventing a cost increase.

Moreover, the vehicle fuel cell cooling system of this embodiment has the thermostat valve 8 on a coolant outlet of the fuel cell stack 1 and is configured to control the stack inlet temperature by operating this thermostat valve 8 and activating the electric heater 10. Accordingly, it is possible to avoid an increase in a negative pressure on an inlet side of the pump 3, which is concerned in the case of providing the thermostat valve 8 on a coolant inlet side (i.e., a confluence point of the radiator side flow path 9 and the bypass flow path 7) of the fuel cell stack 1, thereby significantly suppressing damage on the pump 3 due to cavitation.

<Second Embodiment>

Next, a second embodiment of the present invention will be described. This embodiment is a modified example of the above-described first embodiment, in which the operating temperature of the thermostat valve 8 is set slightly high as compared to the first embodiment on the premise that the fuel cell stack 1 be operated while an operating pressure of the fuel cell stack 1 is reduced to be within a range that does not cause dry-out. Here, the configuration of the system and the outline of the control are similar to the first embodiment. Therefore, only characteristic features of this embodiment will be described, and the description overlapping the first embodiment will be omitted in the following.

As for the running environment of the fuel cell vehicle, it is generally conceived that there are more cases of running at low altitude than cases of running at high altitude. Accordingly, if the operating temperature of the thermostat valve 8 is set up as described in the first embodiment, there may be more situations that require the activation of the electric heater 10, and power consumption will be increased as a consequence. Accordingly, this embodiment is configured to perform operation while reducing the operating pressure of the fuel cell stack 1 at the time of running at high altitude and sets the operating temperature of the thermostat valve 8 so as to maintain the moisture condition of the solid polymer electrolyte membrane of the fuel cell stack 1 within the proper range in this condition. Hence, reduction in the power consumption is achieved by allowing the operating temperature of the thermostat valve 8 to be set higher and reducing a frequency to activate the electric heater 10 at the time of at low altitude in return.

Figure 6:
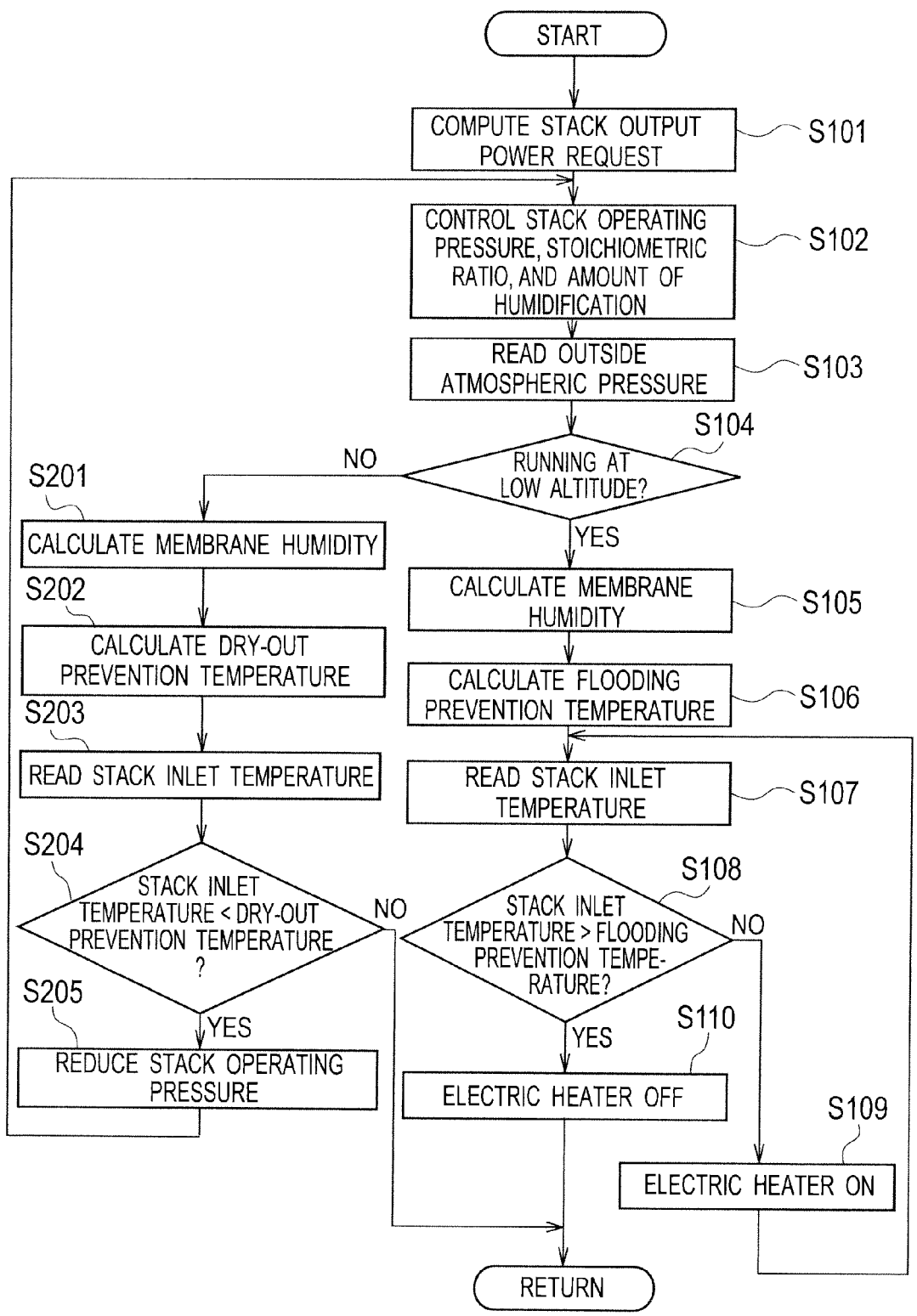
FIG. 6 is a flowchart showing a flow of control by an ECU of the vehicle fuel cell cooling system of a second embodiment.

FIG. 6 is a flowchart showing a flow of control by the ECU 11 which is characteristic in this embodiment. Note that this flowchart in FIG. 6 is equivalent to the flowchart in FIG. 2 described in the first embodiment with addition of processing from step S201 to step S205. Since the processing in other steps is similar to that in the first embodiment, only the processing from step S201 to step S205 will be described herein.

If a judgment is made that the fuel cell vehicle is running at high altitude as a result of judgment in step S104, the ECU 11 calculates the membrane humidity of the solid polymer electrolyte membrane of the fuel cell stack 1 by using the current operating pressure, stoichiometric ratio, amount of humidification, and saturated water vapor pressure of the fuel cell stack 1 in step S201, and calculates a dry-out prevention temperature which is a temperature of the coolant for avoiding occurrence of dry-out in the fuel cell stack 1 in step S202. Here, this dry-out prevention temperature is a value obtained by multiplying a dry-out critical temperature by a given safety ratio (from 0.90 to 0.95, for example). Here, the dry-out critical temperature constitutes a boundary of occurrence of dry-out in the fuel cell stack 1 as the solid polymer electrolyte membrane of the fuel cell stack 1 becomes overdry.

Next, in step S203, the ECU 11 reads the stack inlet temperature detected with the temperature sensor 12. Then, in step S204, the ECU 11 compares the stack inlet temperature read in step S203 with the dry-out prevention temperature calculated in step S202. Thereafter, when the stack inlet temperature exceeds the dry-out prevention temperature, the ECU 11 reduces the operating pressure of the fuel cell stack 1 in step S205 and then returns to step S202 to cause the fuel cell stack 1 to perform power generation at the reduced operating pressure.

When the ECU 11 judges that the fuel cell vehicle is running at high altitude, the ECU 11 repeats the above-described processings until the stack inlet temperature becomes equal to the dry-out prevention temperature, and operates the fuel cell stack 1 while reducing the operating pressure of the fuel cell stack 1 within the range that does not cause dry-out. In this way, even when the operating temperature of the thermostat valve 8 is set slightly high, it is possible to maintain the moisture condition of the solid polymer electrolyte membrane of the fuel cell stack 1 within the proper range by operating this thermostat vale 8 at the time of running at high altitude. Meanwhile, by setting the operating temperature of the thermostat valve 8 slightly high, it is possible to reduce the frequency to activate the electric heater 10 at the time of running at low altitude and thereby to achieve reduction in the power consumption.

Figure 7:
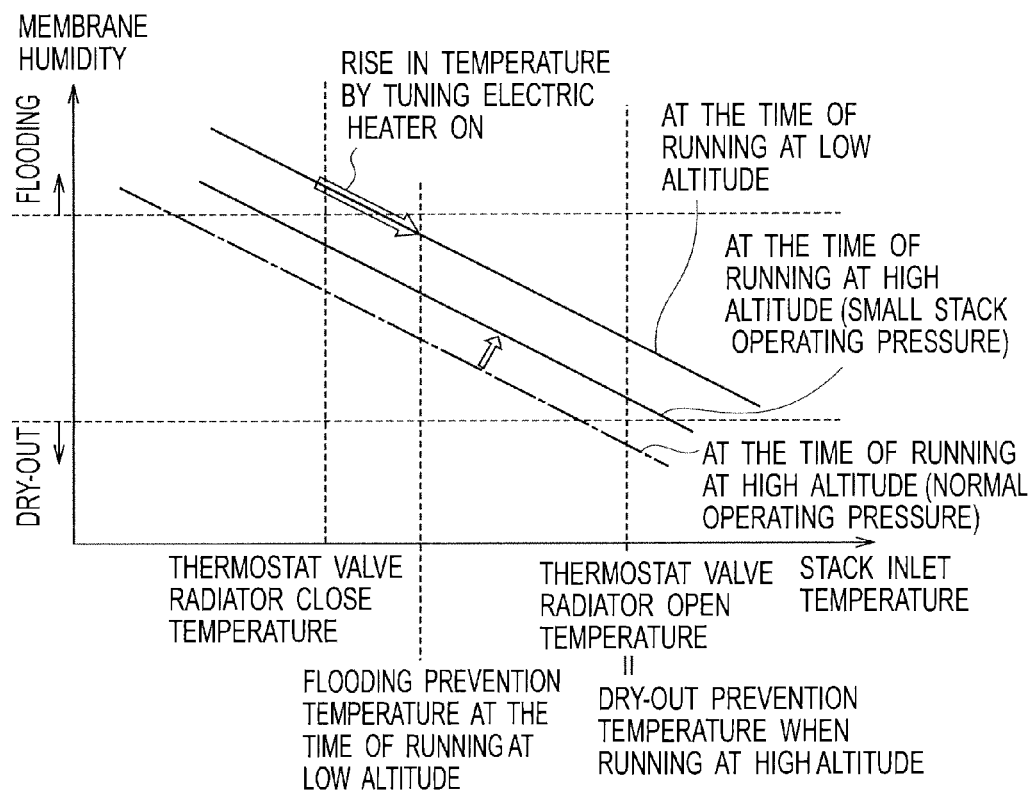
FIG. 7 is a view for explaining an outline of temperature control of a coolant in the vehicle fuel cell cooling system of the second embodiment, which is a characteristic chart showing relations between stack inlet temperature and membrane humidity of a solid polymer electrolyte membrane at the time of running at low altitude and at the time of running at high altitude.

FIG. 7 is a view for explaining an outline of the temperature control of the coolant in the above-described vehicle fuel cell cooling system of this embodiment, which is a characteristic chart showing relations between the stack inlet temperature and the membrane humidity of the solid polymer electrolyte membrane at the time of running at low altitude and at the time of running at high altitude. Here, in this FIG. 7, the vertical axis indicates the membrane humidity of the solid polymer electrolyte membrane of the fuel cell stack 1 and the horizontal axis indicates the stack inlet temperature.

In the vehicle fuel cell cooling system of this embodiment, the fuel cell stack 1 is operated with the operating pressure thereof being reduced within the range that does not cause dry-out while the fuel cell vehicle is running at high altitude. Accordingly, the stack inlet temperature for maintaining the moisture condition of the solid polymer electrolyte membrane within the proper range is shifted to a slightly high level as compared to the case of a normal operating pressure as shown in FIG. 7. For this reason, the one having the operating temperature set slightly high as compared to that in the first embodiment is used as the thermostat valve 8. In this way, while the fuel cell vehicle is running at high altitude, it is possible to prevent flooding and dry-out of the fuel cell stack 1 just by the temperature control of the coolant by operating this thermostat valve 8. On the other hand, while the fuel cell vehicle is running at low altitude, it is necessary to prevent flooding in the fuel cell stack 1 by activating the electric heater 10 similarly to the first embodiment if the stack inlet temperature falls below the flooding prevention temperature at the time of running low altitude. However, since the operating temperature of the thermostat valve 8 is set higher, it is possible to significantly reduce the frequency to activate the electric heater 10 and thereby to achieve reduction in the power consumption.

As described above, according to the vehicle fuel cell cooling system of this embodiment, the operating temperature of the thermostat valve 8 is set slightly high as compared to the first embodiment on the premise that the fuel cell stack 1 be operated at high altitude while reducing the operating pressure thereof within the range that does not cause dry-out. Therefore, it is possible to significantly reduce the frequency to activate the electric heater 10 while the fuel cell vehicle is running at low altitude and thereby to achieve reduction in the power consumption.

<Third Embodiment>

Next, a third embodiment of the present invention will be described. This embodiment uses one which is operated so as to maintain the moisture condition of the solid polymer electrolyte membrane of the fuel cell stack 1 within the proper range at low altitude as the thermostat valve 8. In addition, the embodiment is configured to operate the thermostat valve 8 forcibly by warming up the coolant flowing into the thermostat valve 8 by means of activating the electric heater 10 when there is a concern of dry-out as the temperature of the coolant to be supplied to the fuel cell stack 1 at the time of running high altitude too high, then to lower the temperature of the coolant to be supplied to the fuel cell stack 1 by switching the flow path of the coolant to the radiator 5 side, and thereby to prevent dry-out.

Figure 8:
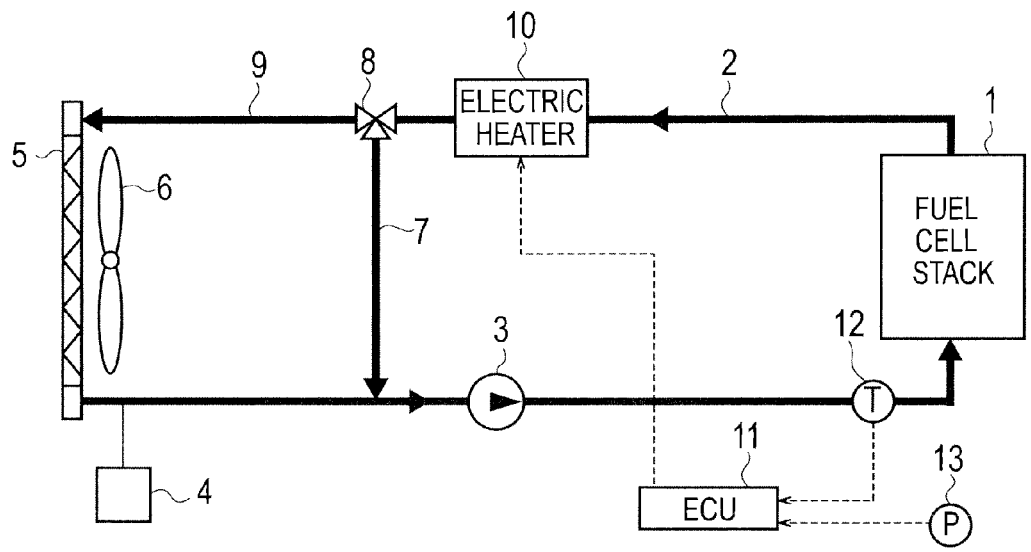
FIG 8 is a configuration diagram showing a configuration of a vehicle fuel cell cooling system of a third embodiment.

FIG. 8 is a configuration diagram of a vehicle fuel cell cooling system of this embodiment. As shown in FIG. 8, in the vehicle fuel cell cooling system of this embodiment, the electric heater 10 is provided between the coolant outlet of the fuel cell stack 1 and an inlet of the thermostat valve 8 in the coolant circulation flow path 2, or namely, at a position immediately upstream of the inlet of the thermostat valve 8. Moreover, the one configured to be operated so as to maintain the moisture condition of the solid polymer electrolyte membrane of the fuel cell stack 1 within the proper range at low altitude is used as the thermostat valve 8. Note that other features are similar to those in the above-described first embodiment.

In the vehicle fuel cell cooling system of this embodiment, the operating temperature of the thermostat valve 8 is determined based on the case of running at low altitude. Accordingly, the temperature of the coolant to be supplied to the fuel cell stack 1 may become too high in the case of running at high altitude where the saturated water vapor pressure is low, if the temperature control of the coolant by means of operating the thermostat valve 8 is used alone. In this case, the solid polymer electrolyte membrane of the fuel cell stack 1 may become overdry and may cause dry-out as a consequence. Therefore, in the vehicle fuel cell cooling system of this embodiment, the ECU 11 warms up the coolant flowing into the thermostat valve 8 by activating the electric heater 10 when the temperature of the coolant to be supplied to the fuel cell stack 1 exceeds a dry-out prevention temperature (a second threshold) determined in view of avoiding the dry-out in the fuel cell stack 1 at high altitude. The ECU 11 then operates the thermostat valve 8 forcibly and to switch the flow path of the coolant to the radiator side. Hence, the temperature of the coolant to be supplied to the fuel cell stack 1 is lowered so as to prevent occurrence of dry-out in the fuel cell stack 1.

FIG. 9 is a flowchart showing a flow of control by the ECU 11 which is characteristic in this embodiment.

First, the ECU 11 computes an output power necessary for the fuel cell stack 1 based on a degree of opening of an accelerator of the fuel cell vehicle in step S301, and then causes the fuel cell stack 1 to perform power generation in step S302 in response to a stack output power request computed in step S301 while controlling an operating pressure, a stoichiometric ratio, and an amount of humidification of the fuel cell stack 1.

Meanwhile, in parallel with the processing in step S302, the ECU 11 reads the detection value of the outside atmospheric pressure sensor 13 in step S303, and then judges in step S304 whether or not the current running environment of the fuel cell vehicle is at high altitude or at low altitude based on the detection value of the outside atmospheric pressure sensor 13 read in step S303.

Then, if the ECU 11 judges that the fuel cell vehicle is running at high altitude, the ECU 11 calculates membrane humidity of the solid polymer electrolyte membrane of the fuel cell stack 1 by using the current operating pressure, stoichiometric ratio, amount of humidification, and saturated water vapor pressure of the fuel cell stack 1 in step S305, and calculates the dry-out prevention temperature (the second threshold) which is the temperature of the coolant for avoiding occurrence of dry-out in the fuel cell stack 1 in step S306. Here, this dry-out prevention temperature is a value obtained by multiplying a dry-out critical temperature by a predetermined safety ratio (from 0.90 to 0.95, for example). Here, the dry-out critical temperature constitutes a boundary of occurrence of dry-out in the fuel cell stack 1 as the solid polymer electrolyte membrane of the fuel cell stack 1 becomes over-dry.

Next, in step S307, the ECU 11 reads the stack inlet temperature detected with the temperature sensor 12. Then, in step S308, the ECU 11 compares the stack inlet temperature read in step S307 with the dry-out prevention temperature calculated in step S306. Thereafter, when the stack inlet temperature exceeds the dry-out prevention temperature, the electric heater 10 is activated in step S309 and the coolant flowing into the thermostat valve 8 is warmed up by the heat from the electric heater 10. Then, the activation of the electric heater 10 is stopped in step S310 when the stack inlet temperature is decreased to a temperature falling below the dry-out prevention temperature.

FIG. 10 is a view for explaining an outline of the temperature control of the coolant in the above-described vehicle fuel cell cooling system of this embodiment, which is a characteristic chart showing relations between the stack inlet temperature and the membrane humidity of the solid polymer electrolyte membrane at the time of running at low altitude and at the time of running at high altitude. Here, in this FIG. 10, the vertical axis indicates the membrane humidity of the solid polymer electrolyte membrane of the fuel cell stack 1 and the horizontal axis indicates the stack inlet temperature.

In the vehicle fuel cell cooling system of this embodiment, the one which is operated to maintain the moisture condition of the solid polymer electrolyte membrane of the fuel cell stack 1 within the proper range at low altitude where the saturated water vapor pressure is high, is used as the thermostat valve 8. Accordingly, while the fuel cell vehicle is running at low altitude, it is possible to prevent flooding and dry-out of the fuel cell stack 1 just by the temperature control of the coolant by operating this thermostat valve 8. On the other hand, since the saturated water vapor pressure at high altitude is lower than that at low altitude, the membrane humidity of the solid polymer electrolyte membrane of the fuel cell stack 1 tends to become low as compared to that at low altitude even when the stack inlet temperature is the same as shown in FIG. 10. Hence, there may be a case where dry-out occurs in the fuel cell stack 1 if the temperature control of the coolant by means of operating the thermostat valve 8 is used alone. Therefore, in the case where the fuel cell vehicle is running at high altitude, the fuel cell stack 1 is prevented from dry-out by activating the electric heater 10 when the stack inlet temperature exceeds the dry-out prevention temperature at the time of running at high altitude, and operating the thermostat valve 8 forcibly and switching the flow path of the coolant to the radiator 5 side to decrease the temperature of the coolant supplied to the fuel cell stack 1. In this way, it is possible to maintain the moisture condition of the solid polymer electrolyte membrane of the fuel cell stack 1 within the proper range when the fuel cell vehicle is running at low altitude and when the fuel cell vehicle is running at high altitude, and thereby to prevent flooding and dry-out of the fuel cell stack 1.

Next, a concrete example of control to bring the stack inlet temperature close to an optimum value by use of the above-described vehicle fuel cell cooling system of this embodiment will be described with reference to FIG. 11 and FIG. 12. Here, FIG. 11 is a view showing an example of an operating state of the thermostat valve 8 and activation timing of the electric heater 10 relative to the stack inlet temperature, and FIG. 12 is a view showing how the temperature of the coolant changes in each unit provided on the coolant circulation flow path 2.

As previously described in the first embodiment, in order to allow the fuel cell stack 1 using the solid polymer electrolyte membrane to perform power generation efficiently, it is desirable to control the stack inlet temperature close to about 60° C. at low altitude or close to about 50° C. at high altitude. Accordingly, in this embodiment, the coolant on the inlet side of the thermostat valve 8 is warmed up by activating the electric heater 10 at high altitude as shown in FIG. 11 and FIG. 12 while using the thermostat valve 8 that is operated to bring the stack inlet temperature close to 60° C., thereby controlling the stack inlet temperature to be close to 60° C. Here, in the example shown in FIG. 11, the electric heater for promoting warm-up of the fuel cell stack 1 at the time of start-up at the temperature below 0° C. is used as the electric heater 10, so that the electric heater 10 is activated at low altitude and at high altitude when starting up at the temperature below 0° C. However, in the case other than the start-up at the temperature below 0° C., the electric heater 10 is activated at the time of running at high altitude in order to bring the stack inlet temperature close to 50° C. Here, if the flow rate of the coolant to be supplied to the fuel cell stack 1 is equal to 15 L/min, a heater output around 10 kW is required to increase the temperature of the coolant by 10 degrees by means of activating the electric heater 10.

Figure 12:
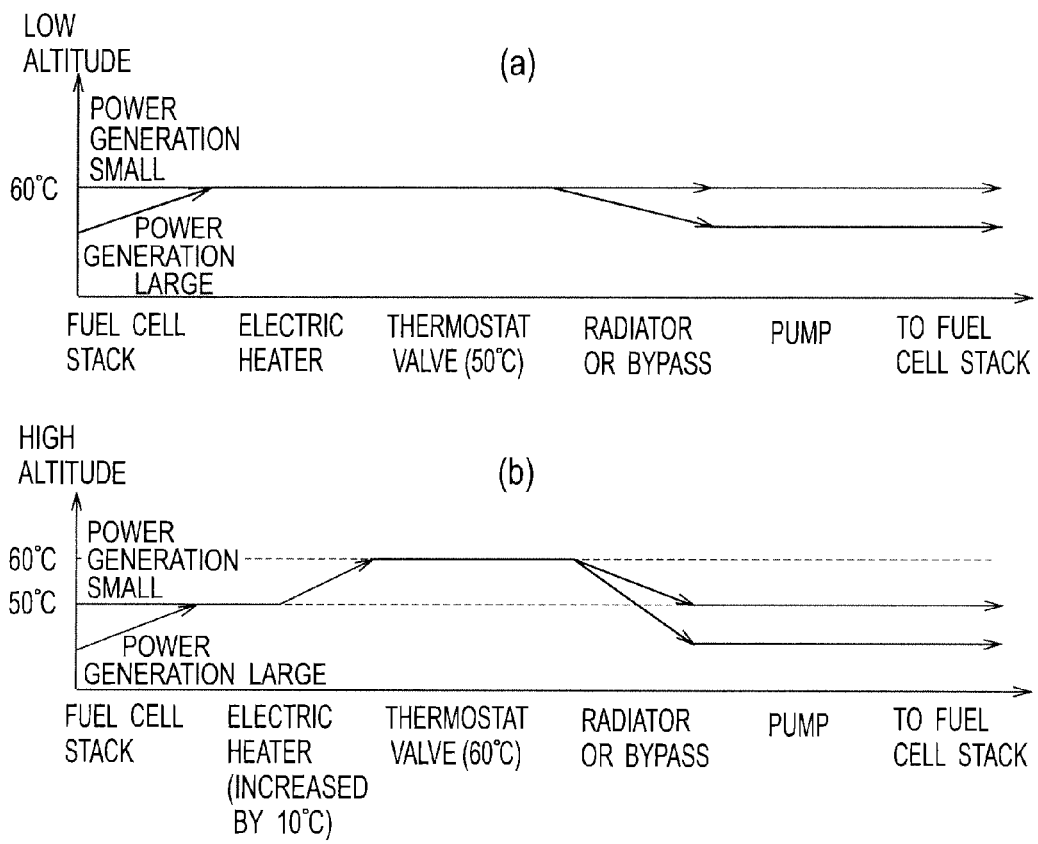
FIG. 12 is a view showing how the temperature of the coolant changes in each unit provided on a coolant circulation flow path.

As shown in these FIG. 11 and FIG. 12, it turns out to be possible to bring the stack inlet temperature close to 60° C. at low altitude by operating the thermostat valve 8, and meanwhile, to bring the stack inlet temperature close to 50° C. at high altitude not only by operating the thermostat valve 8 but also by activating the electric heater 10.

As described above in detail by citing the concrete example, according to the vehicle fuel cell cooling system of this embodiment, the one configured to be operated so as to maintain the moisture condition of the solid polymer electrolyte membrane of the fuel cell stack 1 within the proper range at low altitude is used as the thermostat valve 8, and the ECU 11 controls to activate the electric heater 10 when the stack inlet temperature exceeds the dry-out prevention temperature at the time of running at high altitude when the fuel cell vehicle is running at high altitude. Hence, it is possible to reliably prevent dry-out of the fuel cell stack 1 at the time of running at high altitude.

Meanwhile, the vehicle fuel cell cooling system of this embodiment is configured to switch the flow path of the coolant by using the simple thermostat valve 8 without using the electrically controlled three-way valve which involves the complicated structures and control. Accordingly, it is possible to realize the system at low costs. Moreover, by using the electric heater already installed for promoting warm-up when starting at the temperature below 0° C. as the electric heater 10, it is unnecessary to add a new device, thereby preventing a cost increase.

Moreover, the vehicle fuel cell cooling system of this embodiment has the thermostat valve 8 on the coolant outlet of the fuel cell stack 1 and is configured to control the stack inlet temperature by operating this thermostat valve 8 and activating the electric heater 10. Accordingly, it is possible to avoid an increase in a negative pressure on the inlet side of the pump 3 which is concerned in the case of providing the thermostat valve 8 on the coolant inlet side (i.e., the confluence point of the radiator side flow path 9 and the bypass flow path 7) of the fuel cell stack 1, thereby effectively suppressing damage on the pump 3 due to cavitation.

<Fourth Embodiment>

Next, a fourth embodiment of the present invention will be described. This embodiment is a modified example of the above-described first to third embodiments, which is configured to allow the ECU 11 to control the output from the electric heater 10 when activating the electric heater 10 and controlling the stack inlet temperature. Here, the ECU 11 controls the output from the electric heater 10 in accordance with a difference between the stack inlet temperature at that point of time and any of the flooding prevention temperature at the time of running at low altitude and the dry-out prevention temperature at the time of running at high altitude.

As described in conjunction with the first embodiment and the second embodiment, in the case of the structure using the one having the operating temperature set up based on the case of running at high altitude as the thermostat valve 8 and providing the electric heater 10 at a position immediately upstream of the coolant inlet of the fuel cell stack 1, the ECU 11 is configured to activate the electric heater 10 when the stack inlet temperature falls below the flooding prevention temperature at the time of running at low altitude, and thereby to prevent flooding in the fuel cell stack 1. Meanwhile, as described in conjunction with the third embodiment, in the case of the structure using the one having the operating temperature set up based on the case of running at low altitude as the thermostat valve 8 and providing the electric heater 10 at a position immediately upstream of the inlet of the thermostat valve 8, the ECU 11 is configured to activate the electric heater when the stack inlet temperature exceeds the dry-out prevention temperature at the time of running at high altitude, and thereby to prevent dry-out in the fuel cell stack 1.

Here, the rise in temperature of the coolant when activating the electric heater 10 depends on magnitude of an output from the electric heater 10, and it is possible to enhance a temperature rise ratio of the coolant by increasing the output from the electric heater 10. Accordingly, in this embodiment, in the case of the structure described in conjunction with the first and second embodiment, the ECU 11 is configured to control the output from the electric heater 10 when activating the electric heater 10 and controlling the stack inlet temperature, in accordance with the difference between the stack inlet temperature at that point of time and the flooding prevention temperature at the time of running at low altitude. Meanwhile, in the case of the structure described in conjunction with the third embodiment, the ECU 11 is configured to control the output from the electric heater 10 in accordance with the difference between the stack inlet temperature at that point and the dry-out prevention temperature at the time of running at high altitude. Hence, it is possible to have the stack inlet temperature converge on a target temperature and thereby to control the moisture condition of the solid polymer electrolyte membrane of the fuel cell stack 1 more properly.

Figure 13:
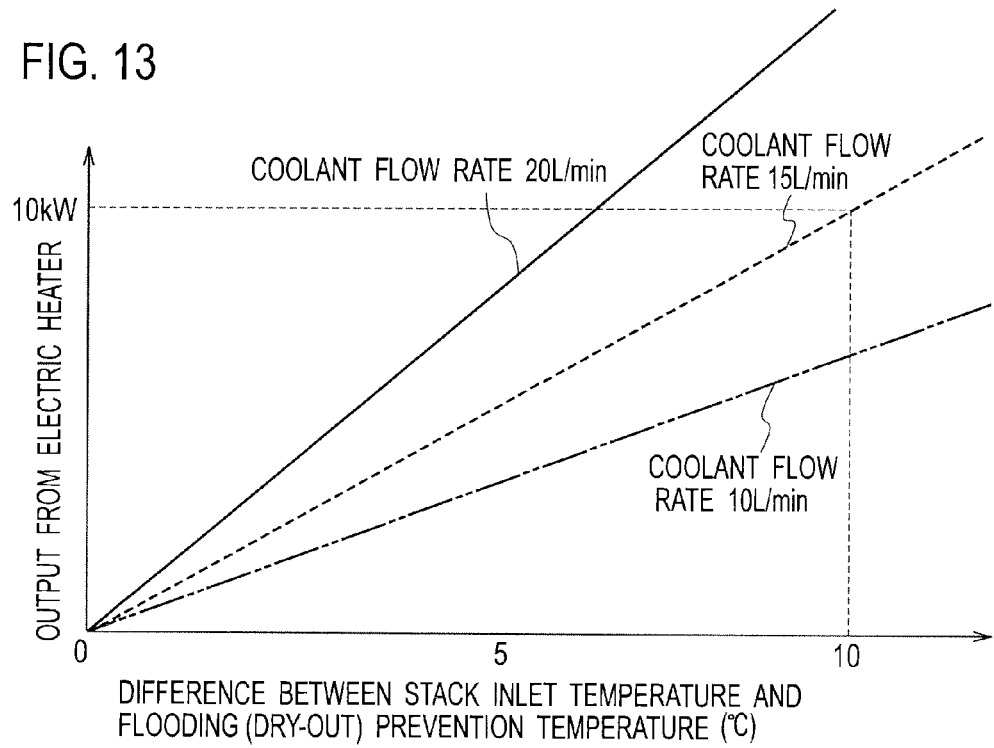
FIG. 13 is a view showing an example of an output control curve of an electric heater when an ECU activates the electric heater in a vehicle fuel cell cooling system of a fourth embodiment.

FIG. 13 is a view showing an example of an output control curve of the electric heater 10 when the ECU 11 activates the electric heater 10 in the vehicle fuel cell cooling system of this embodiment.

In this embodiment, either the difference between the stack inlet temperature and the flooding prevention temperature in the case of running at low altitude or the difference between the stack inlet temperature and the dry-out prevention temperature in the case of running at high altitude is obtained when the ECU 11 activates the electric heater 10. Moreover, the output from the electric heater 10 is increased as the difference is larger and the output from the electric heater 10 is decreased as the difference becomes smaller. Meanwhile, the magnitude of the output from the electric heater 10 at this point of time is determined in consideration of the flow rate of the coolant to be supplied to the fuel cell stack 1 as well, whereby the output from the electric heater 10 is increased when the flow rate of the coolant to be supplied to the fuel cell stack 1 is larger. Since the ECU 11 controls the output from the electric heater 10 as described above, feedback control becomes effective and the stack inlet temperature converges on the target temperature.

As described above, according to the vehicle fuel cell cooling system of this embodiment, when the ECU 11 controls the stack inlet temperature by activating the electric heater 10, the ECU 11 controls the output from the electric heater 10 depending in accordance with the difference between the stack inlet temperature at that point of time and any of the flooding prevention temperature at the time of running at low altitude and the dry-out prevention temperature at the time of running at high altitude. Hence, it is possible to have the stack inlet temperature converge on the target temperature, and thereby to control the moisture condition of the solid polymer electrolyte membrane of the fuel cell stack 1 more properly and to suppress wasted power consumption by the electric heater 10.

Although the first to fourth embodiments have been described above as concrete examples of the vehicle fuel cell cooling system to which the present invention is applied, it is to be understood that the respective embodiments described above are merely examples of the present invention which do not intend to limit the technical scope of the present invention to the contents explained in conjunction with those respective embodiments. In other words, the technical scope of the present invention is not limited to the concrete technical matters disclosed in the respective embodiments but also encompasses various modifications, changes, alternative techniques, and so forth that can be derived from this disclosure.

[Industrial Applicability]

The present invention is applicable to a technique for maintaining a moisture condition of a membrane in a fuel cell within a proper range irrespective of a running environment of a vehicle in which the fuel cell is installed.

REFERENCE SIGNS LIST

1 FUEL CELL STACK
5 RADIATOR (COOLING BODY)
7 BYPASS FLOW PATH (SECOND FLOW PATH)
8 THERMOSTAT VALVE
9 RADIATOR SIDE FLOW PATH (FIRST FLOW PATH)
10 ELECTRIC HEATER (WARMING DEVICE)
11 ECU (CONTROLLING MEANS)

The invention claimed is:

1. A vehicle fuel cell cooling system configured to circulate and supply a coolant to a fuel cell installed in a vehicle and to perform temperature control of the fuel cell, the system comprising:
a temperature sensor configured to detect a temperature of the coolant;
an outside atmospheric pressure sensor configured to detect an outside atmospheric pressure;
a radiator configured to discharge heat from the coolant to outside air;
a first coolant flow path configured to supply the coolant which has cooled the fuel cell to the radiator;
a second coolant flow path configured to allow the coolant which has cooled the fuel cell to bypass the radiator;
a thermostat valve configured to switch between the first coolant flow path and the second coolant flow path in accordance with the temperature of the coolant, wherein an operating temperature of the thermostat valve is preset such that the temperature of the coolant to be supplied to the fuel cell becomes a temperature for maintaining a moisture condition of a membrane of the fuel cell within a predetermined range when the outside atmospheric pressure is at a predetermined first pressure;
a warming device configured to warm up the coolant; and
a controller programmed to control the warming device based on the temperature of the coolant and the outside atmospheric pressure, and to raise the temperature of the coolant flowing into the fuel cell in a case where the outside atmospheric pressure is higher than the predetermined first pressure.

2. The vehicle fuel cell cooling system according to claim 1,
wherein the controller controls activation of the warming device based on the temperature of the coolant at a coolant inlet of the fuel cell and the outside atmospheric pressure.

3. The vehicle fuel cell cooling system according to claim 2,
wherein the predetermined first pressure corresponds to an outside atmospheric pressure at high altitude,
the warming device is provided between an outlet of the thermostat valve and the coolant inlet of the fuel cell, and
the controller activates the warming device when the outside atmospheric pressure indicates low altitude and when the temperature of the coolant at the coolant inlet of the fuel cell falls below a first threshold determined in view of avoiding an occurrence of flooding in the fuel cell at low altitude.

4. The vehicle fuel cell cooling system according to claim 3,
wherein the operating temperature of the thermostat valve is set up such that the temperature of the coolant to be supplied to the fuel cell becomes the temperature for maintaining the moisture condition of the membrane of the fuel cell within the predetermined range in a state where an operating pressure of the fuel cell is reduced at high altitude.

5. The vehicle fuel cell cooling system according to claim 3,
wherein the controller controls an output from the warming device in accordance with a difference between the temperature of the coolant at the coolant inlet of the fuel cell and the first threshold.

6. A vehicle fuel cell cooling system configured to circulate and supply a coolant to a fuel cell installed in a vehicle and to perform temperature control of the fuel cell, the system comprising:
a temperature sensing means for detecting a temperature of the coolant;
an outside atmospheric pressure sensing means for detecting an outside atmospheric pressure;
a radiator configured to discharge heat from the coolant to outside air;
a first coolant flow path configured to supply the coolant which has cooled the fuel cell to the radiator;
a second coolant flow path configured to allow the coolant which has cooled the fuel cell to bypass the radiator;
a thermostat valve configured to switch between the first coolant flow path and the second coolant flow path in accordance with the temperature of the coolant, wherein an operating temperature of the thermostat valve is preset such that the temperature of the coolant to be supplied to the fuel cell becomes a temperature for maintaining a moisture condition of a membrane of the fuel cell within a predetermined range when the outside atmospheric pressure is at a predetermined first pressure;
a warming means for warming up the coolant; and
controlling means programmed to control the warming means based on the temperature of the coolant and the outside atmospheric pressure, and to raise the temperature of the coolant flowing into the fuel cell in a case where the outside atmospheric pressure is higher than the predetermined first pressure.

7. A vehicle fuel cell cooling system configured to circulate and supply a coolant to a fuel cell installed in a vehicle and to perform temperature control of the fuel cell, the system comprising:
a temperature sensor configured to detect a temperature of the coolant;
an outside atmospheric pressure sensor configured to detect an outside atmospheric pressure;
a radiator configured to discharge heat from the coolant to outside air;
a first coolant flow path configured to supply the coolant which has cooled the fuel cell to the radiator;
a second coolant flow path configured to allow the coolant which has cooled the fuel cell to bypass the radiator;
a thermostat valve configured to switch between the first coolant flow path and the second coolant flow path in accordance with the temperature of the coolant, wherein an operating temperature of the thermostat valve is preset such that the temperature of the coolant to be supplied to the fuel cell becomes a temperature for maintaining a moisture condition of a membrane of the fuel cell within a predetermined range when the outside atmospheric pressure is at a predetermined second pressure;
a warming device configured to warm up the coolant; and
a controller programmed to control the warming device based on the temperature of the coolant and the outside atmospheric pressure, and to lower the temperature of the coolant flowing into the fuel cell in a case where the outside atmospheric pressure is lower than the predetermined second pressure.

8. The vehicle fuel cell cooling system according to claim 7, wherein the controller controls activation of the warming device based on the temperature of the coolant at a coolant inlet of the fuel cell and the outside atmospheric pressure.

9. A vehicle fuel cell cooling system configured to circulate and supply a coolant to a fuel cell installed in a vehicle and to perform temperature control of the fuel cell, the system comprising:
- a temperature sensing means for detecting a temperature of the coolant;
- an outside atmospheric pressure sensing means for detecting an outside atmospheric pressure;
- a radiator configured to discharge heat from the coolant to outside air;
- a first coolant flow path configured to supply the coolant which has cooled the fuel cell to the radiator;
- a second coolant flow path configured to allow the coolant which has cooled the fuel cell to bypass the radiator;
- a thermostat valve configured to switch between the first coolant flow path and the second coolant flow path in accordance with the temperature of the coolant, wherein an operating temperature of the thermostat valve is preset such that the temperature of the coolant to be supplied to the fuel cell becomes a temperature for maintaining a moisture condition of a membrane of the fuel cell within a predetermined range when the outside atmospheric pressure is at a predetermined second pressure;
- a warming means for warming up the coolant; and
- controlling means programmed to control the warming means based on the temperature of the coolant and the outside atmospheric pressure, and to lower the temperature of the coolant flowing into the fuel cell in a case where the outside atmospheric pressure is lower than the predetermined second pressure.

10. The vehicle fuel cell cooling system according to claim 8,
wherein the predetermined second pressure corresponds to an outside atmospheric pressure at low altitude,
the warming device is provided between a coolant outlet of the fuel cell and an inlet of the thermostat valve, and
the controller activates the warming device when the outside atmospheric pressure indicates high altitude and when the temperature of the coolant at the coolant inlet of the fuel cell exceeds a second threshold determined in view of avoiding an occurrence of dry-out in the fuel cell at high altitude.

11. The vehicle fuel cell cooling system according to claim 10,
wherein the controller controls an output from the warming device in accordance with a difference between the temperature of the coolant at the coolant inlet of the fuel cell and the second threshold.

* * * * *